United States Patent
Davis et al.

(10) Patent No.: US 12,206,884 B2
(45) Date of Patent: *Jan. 21, 2025

(54) METHODS AND APPARATUS FOR DELIVERING EXTENDED PAYLOADS WITH COMPOSITE WATERMARKS

(71) Applicant: The Nielsen Company (US), LLC, New York, NY (US)

(72) Inventors: Jeremey M. Davis, New Port Richey, FL (US); David Gish, Riverdale, NJ (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,617

(22) Filed: Sep. 25, 2023

(65) Prior Publication Data

US 2024/0137549 A1   Apr. 25, 2024
US 2024/0236356 A9   Jul. 11, 2024

Related U.S. Application Data

(63) Continuation of application No. 17/345,756, filed on Jun. 11, 2021, now Pat. No. 11,800,132, which is a continuation of application No. 16/360,992, filed on Mar. 21, 2019, now Pat. No. 11,039,160.

(51) Int. Cl.
*H04N 19/467*      (2014.01)
*H04N 21/8358*    (2011.01)
*H04N 21/845*     (2011.01)

(52) U.S. Cl.
CPC ....... *H04N 19/467* (2014.11); *H04N 21/8358* (2013.01); *H04N 21/8455* (2013.01)

(58) Field of Classification Search
None
See application file for complete search history.

(56) References Cited

U.S. PATENT DOCUMENTS

| 8,127,137 B2 * | 2/2012 | Levy | H04N 1/32144 380/54 |
|---|---|---|---|
| 2013/0152210 A1 * | 6/2013 | Petrovic | H04N 1/32144 726/26 |
| 2015/0261753 A1 * | 9/2015 | Winograd | H04N 21/2187 707/736 |

* cited by examiner

*Primary Examiner* — Heather R Jones

(57) ABSTRACT

Methods, apparatus, systems and articles of manufacture are disclosed for delivering extended payloads with composite watermarks. Examples disclosed herein embed a first watermark into a media stream in accordance with a first watermark technology, where the first watermark includes a first indicator bit and a first payload. Disclosed examples also embed a second watermark into the media stream in accordance with a second watermark technology, where the second watermark includes a second indicator bit and a second payload. In some disclosed examples, the first indicator bit and the second indicator bit are to indicate whether the first payload and the second payload are to be combined when the first watermark and the second watermark are decoded.

18 Claims, 9 Drawing Sheets

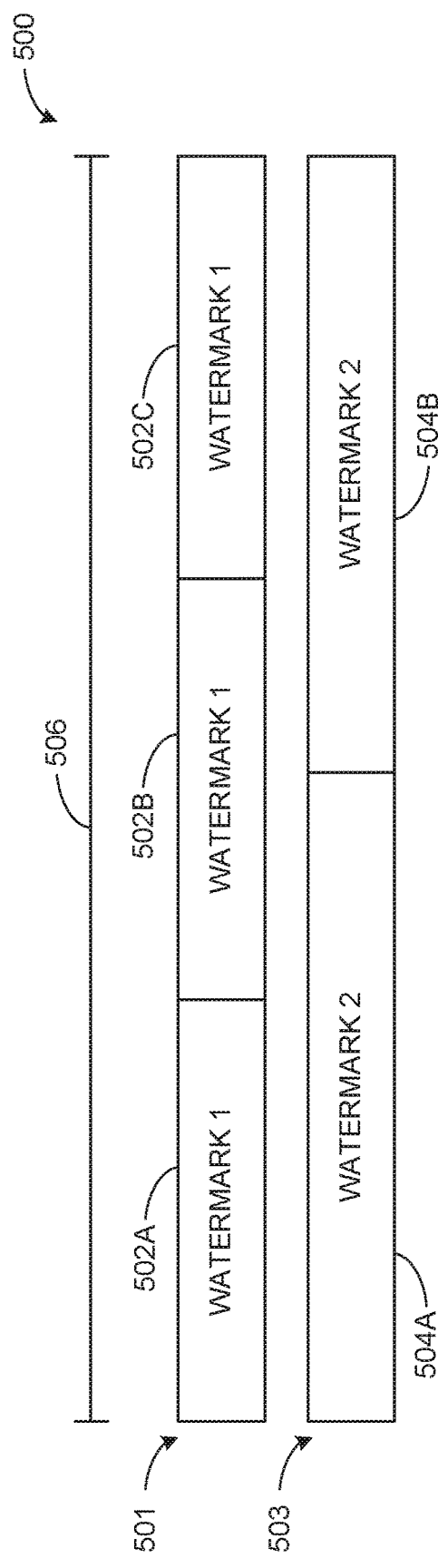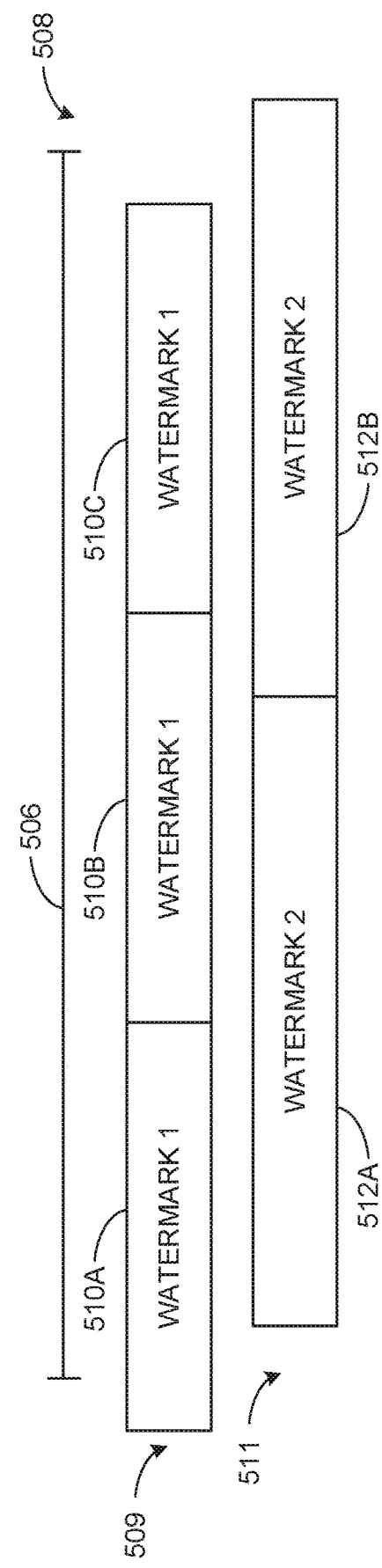
FIG. 5A
FIG. 5B

METHODS AND APPARATUS FOR DELIVERING EXTENDED PAYLOADS WITH COMPOSITE WATERMARKS

CROSS-REFERENCE TO RELATED APPLICATIONS

The present disclosure is a continuation of U.S. patent application Ser. No. 17/345,756, filed Jun. 11, 2021, now U.S. Pat. No. 11,800,132, which is a continuation of U.S. patent application Ser. No. 16/360,992, filed Mar. 21, 2019, now U.S. Pat. No. 11,039,160. U.S. patent application Ser. Nos. 16/360,992 and 17/345,756 are hereby incorporated herein by reference in their entireties. Priority to U.S. patent application Ser. Nos. 16/360,992 and 17/345,756 is hereby claimed.

FIELD OF THE DISCLOSURE

This disclosure relates generally to watermark encoding, and, more particularly, to methods and apparatus for delivering extended payloads with composite watermarks.

BACKGROUND

Some media includes embedded watermarks that allow subsequent detection of the media by decoding the watermarks in the presented media. For example, a broadcasting entity (e.g., a radio broadcaster, a television broadcaster, an internet streamer, etc.) may encode watermarks into media signals. A media monitoring entity may then detect the watermarks in the media signals during monitoring activities and accurately determine, based on identification information associated with the watermark, that the media (e.g., a television show, a film, a commercial etc.) corresponding to the media signals was presented to by a media device.

BRIEF DESCRIPTION OF THE DRAWINGS

FIGS. 5A and 5B are block diagrams of alignments of example outputs of the watermark encoder of FIG. 2.

The figures are not to scale. In general, the same reference numbers will be used throughout the drawing(s) and accompanying written description to refer to the same or like parts.

Figure 1:
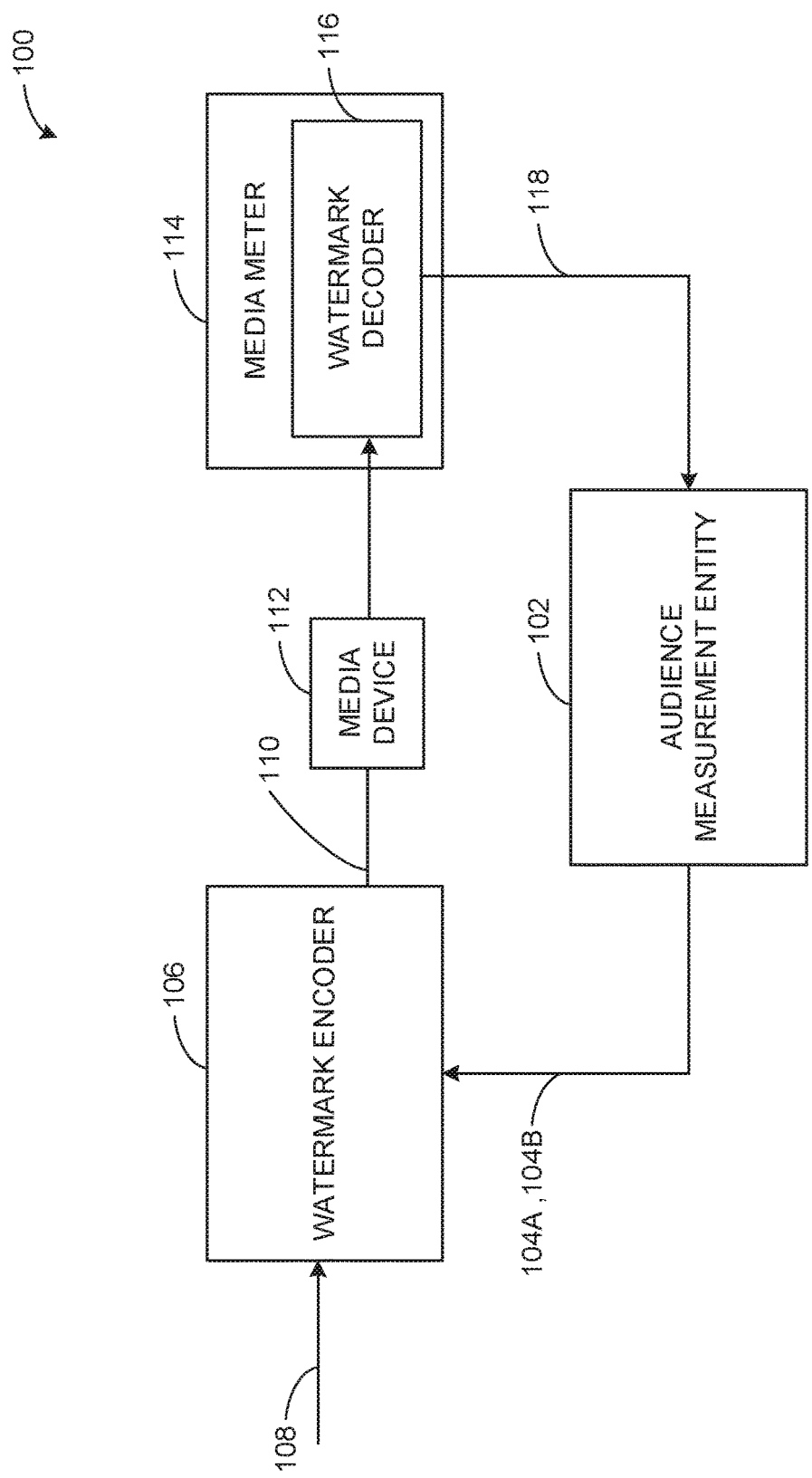
FIG. 1 is a block diagram of an example environment in which the teachings of this disclosure may be implemented

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

As used herein, the term "media" includes any type of content and/or advertisement delivered via any type of distribution medium. Thus, media includes television programming or advertisements, radio programming or advertisements, movies, web sites, streaming media, etc.

Example methods, apparatus, and articles of manufacture disclosed herein monitor media presentations by media devices. Such media devices may include, for example, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc.

In some examples, media monitoring information is aggregated to determine ownership and/or usage statistics of media device(s), determine the media presented by the media device(s), determine audience ratings, relative rankings of usage and/or ownership of media devices, types of uses of media devices (e.g., whether a device is used for browsing the Internet, streaming media from the Internet, etc.), and/or other types of media device information. In some examples disclosed herein, monitoring information includes, but is not limited to, media identifying information (e.g., media-identifying metadata, codes, signatures, watermarks, and/or other information that may be used to identify presented media), application usage information (e.g., an identifier of an application, a time and/or duration of use of the application, a rating of the application, etc.), and/or user-identifying information (e.g., demographic information, a user identifier, a panelist identifier, a username, etc.).

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), representing media identifying information and/or an identifier that may be mapped to media identifying information, into an audio and/or video component. In some examples, the watermark is embedded in the audio or video component so that the watermark is hidden. This embedding may be carried out utilizing psychoacoustic masking.

As used herein, the terms "code" and "watermark" are used interchangeably and are defined to mean any information (e.g., an identifier) that may be inserted or embedded in the audio or video of media (e.g., a program or advertisement) for the purpose of identifying the media or for another purpose, such as tuning (e.g., a packet identifying header), copyright protection, etc.

Watermarks can be limited by the size of the payload (e.g., the number of bits of the payload) supported by the watermark encoding technology used to encode the watermark. As more media (e.g., content, advertisement, etc.) is created, the size of the identifier required to uniquely identify the media also increases. For example, some new media identifiers are 64-bits in length. However, in some examples, existing watermarking technologies (e.g., Nielsen Commercial Code Watermarks (NWCC), Critical Band Encoding Technology commercial codes (CBET CC), etc.) may not be sufficiently sized to support large payload sizes large enough to support such lengthy media identifier (and/or other large blocks of data).

Accordingly, methods, apparatus and articles of manufactures disclosed herein adapt existing watermark technologies such that their individual watermark payloads can be combined into a larger overall watermark payload. In some examples disclosed herein, existing watermark technology is adapted such that the individual watermark payloads can be used to bolster one another. In some examples disclosed herein, a first watermark associated with a first watermark technology and a second watermark associated with a second watermark technology are embedded in the same media stream. In some examples disclosed herein, one or more bits of each embedded watermark are used to indicated whether the payloads of the individual watermarks are to be combined, used to bolster one another, or treated separately. In some examples disclosed herein, the alignment of the watermarks associated with different watermark technologies is determined (e.g., aligned over the same time window, etc.). In some examples disclosed herein, the alignment can be used to determine if the watermarks were encoded by the same encoder. In some examples disclosed herein, when the watermarks are out of phase, the watermarks are decoded separately regardless of the leading bits.

FIG. 1 is a block diagram of an example environment 100 in which the teachings of this disclosure may be implemented. The example environment 100 includes an example audience measurement entity 102 which transmits example watermarks 104A, 104B to an example watermark encoder 106. The example watermark encoder 106 receives an example media stream 108, encodes the watermarks 104A, 104B into the media stream 108 and output a resulting example an encoded media stream 110 to be received by an example media device 112. The media presented at the example media device 112 is detected by an example media meter 114, which includes an example watermark decoder 116. In the illustrated example of FIG. 1, the watermark decoder 116 detects the watermarks 104A, 104B embedded in the encoded media stream 110, which the watermark decoder 116 uses to create a media identifier 118. In the illustrated example of FIG. 1, the watermark decoder 116 transmits the media identifier 118 to the audience measurement entity 102. While the examples of FIGS. 1-7 are described with reference to the first watermark 104A and the second watermark 104B, the example methods, apparatus and articles of manufacture have been disclosed herein can be applied to any number of watermarks.

The example audience measurement entity 102 (e.g., a media monitoring entity, etc.) determines audience engagement levels for media programming and/or advertisements (e.g., associated with the media stream 108, etc.). In the illustrated example, the audience measurement entity 102 provides (e.g., transmits, etc.) the example watermarks 104A, 104B to the watermark encoder 106. In some examples, when media encoded with the example watermarks 104A, 104B is presented, the media meter 114 can detect the embedded watermarks 104A, 104B and transmit media identification information decoded therefrom (e.g., the media identifier 118, etc.) to the audience measurement entity 102. The audience measurement entity 102 can credit media exposure using the media identifier 118. In some examples, the audience measurement entity 102 can be a physical location with associated hardware (e.g., server(s), transceiver(s), etc.). In other examples, the audience measurement entity 102 can be fully or partially implemented by a cloud service (e.g., Amazon Web Services, etc.).

In the illustrated example, the encoded watermarks 104A, 104B are codes that are to be embedded in the media stream 108. In some examples, the watermarks 104A, 104B include payloads, filler information and/or indicator bit(s). In some examples, the payloads can include media identifying information and/or an identifier that may be mapped to media identifying information. In the illustrated example, the first watermark 104A is associated with a first watermarking technology (e.g., NWCC, etc.) with an associated encoding schema. As used herein, an "encoding schema" refers to the parameters determining how a watermark (e.g., the watermarks 104A, 104B) is embedded in a media stream. The parameters of an encoding schema can specify the frequency or frequencies of the media stream in which the watermark is embedded, the encoding rate, the payload size, etc. In the illustrated example, the second watermark 104B is associated with a second watermarking technology (e.g., CBET CC, etc.) with an associated second encoding schema. In some examples, the payload of the first watermark 104A is a different size (e.g., contains a different number of bits, etc.) than the second watermark 104B. In some examples, the payloads of the watermarks 104A, 104B can be the same size. In some examples, the watermarks 104A, 104B can be associated with the same watermarking technology but are encoded with different encoding schema. Example data configurations of the watermarks 104A, 104B are described below in conjunction with FIGS. 4A and 4B. Example alignments of the watermarks 104A, 104B are described below in conjunction with FIGS. 5A and 5B.

The example media stream 108 is a source of media associated with a media provider. In some examples, the media stream 108 is associated with a television provider. For example, the media stream can include a television feed (e.g., ESPN, CNN, TNT, etc.) that presents continuous media. In some examples, the media stream 108 can be associated with any suitable type of media and/or media provider (e.g., a radio feed, a streaming service feed, etc.). In some examples, the media stream 108 is provided to the watermark encoder 106 live. In some examples, the media stream 108 can be provided to the watermark encoder 106 at a time delay.

The example watermark encoder 106 embeds the example watermarks 104A, 104B into the media stream 108 to create the encoded media stream 110. In the illustrated example, the watermark encoder 106 embeds the first watermark 104A into the media stream 108 according to the first encoding schema and embeds the second watermark 104B into the media stream 108 according to the second encoding schema. In some examples, the watermark encoder 106 can set the alignment of the first watermark 104A and the second watermark 104B. In some examples, the watermark encoder 106 can embed the watermark 104A, 104B in a manner that allows the watermarks 104A, 104B to be combined when decoded. In other examples, the watermark encoder 106 can embed the watermarks 104A, 104B in a manner that allows the second watermark 104B to bolster the first watermark 104A.

The example media device 112 of the illustrated example shown in FIG. 1 presents the media associated with the encoded media stream 110. In some examples, the media device 112 is capable of directly presenting media (e.g., via a display) while, in other examples, the media device 112 presents the media on separate media presentation equipment (e.g., speakers, a display, etc.). Thus, as used herein "media devices" may or may not be able to present media without assistance from a second device. Media devices are typically consumer electronics. For example, the media device 112 of the illustrated example of FIG. 1 can be any suitable type(s) and/or number(s) of media device(s). For example, Internet-enabled mobile handsets (e.g., a smartphone, an iPod®, etc.), video game consoles (e.g., Xbox®, PlayStation 3, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The example media meter 114 collects media monitoring information. In some examples, the media meter 114 is associated with the media device 112. For example, the media meter 114 can be directly connected (e.g., physical connections) to the media device 112, and/or may be connected wirelessly (e.g., via Wi-Fi, via Bluetooth, etc.) to the media device 112 to be monitored. In some examples, the media meter 114 can be an application installed on the media device 112. In other examples, the media meter 114 can be a portable device carried by a user associated with the media device 112. In the illustrated example, the media meter 114 detects watermarks (e.g., with the watermark decoder 116) in the encoded media stream 110 and generates the media identifier 118.

The example watermark decoder 116 decodes and processes the watermarks 104A, 104B embedded in the encoded media stream 110. In some examples, the watermark decoder 116 can combine the payloads of the watermarks 104A, 104B. In some examples, the watermark decoder 116 can use the second watermark 104B to bolster the first watermark 104A. In some examples, the watermark decoder 116 can treat the first watermark 104A independently from the second watermark 104B. In some examples, the watermark decoder 116 can detect one or more indicator bits of the watermarks 104A, 104B to determine if the watermarks are to be combined, used to bolster one another, or treated separately. In some examples, the watermark decoder 116 can further determine how to process the watermarks 104A, 104B based on the alignment of the watermarks 104A, 104B relative to each other. In some examples, the watermark decoder 116 can generate the media identifier based on the first watermark 104A and/or the second watermark 104B.

The example media identifier 118 includes information that allows the audience measure entity 102 to credit the user(s) associated with media device 112 with exposure to the media presented by the media device 112. For example, the media identifier 118 can include media identifying information (e.g., included in the payloads of the watermark 104A, 104B, etc.), timestamp(s) and/or user identifying information. In other examples, the media identifier 118 can include any other suitable information, etc.

Figure 2:
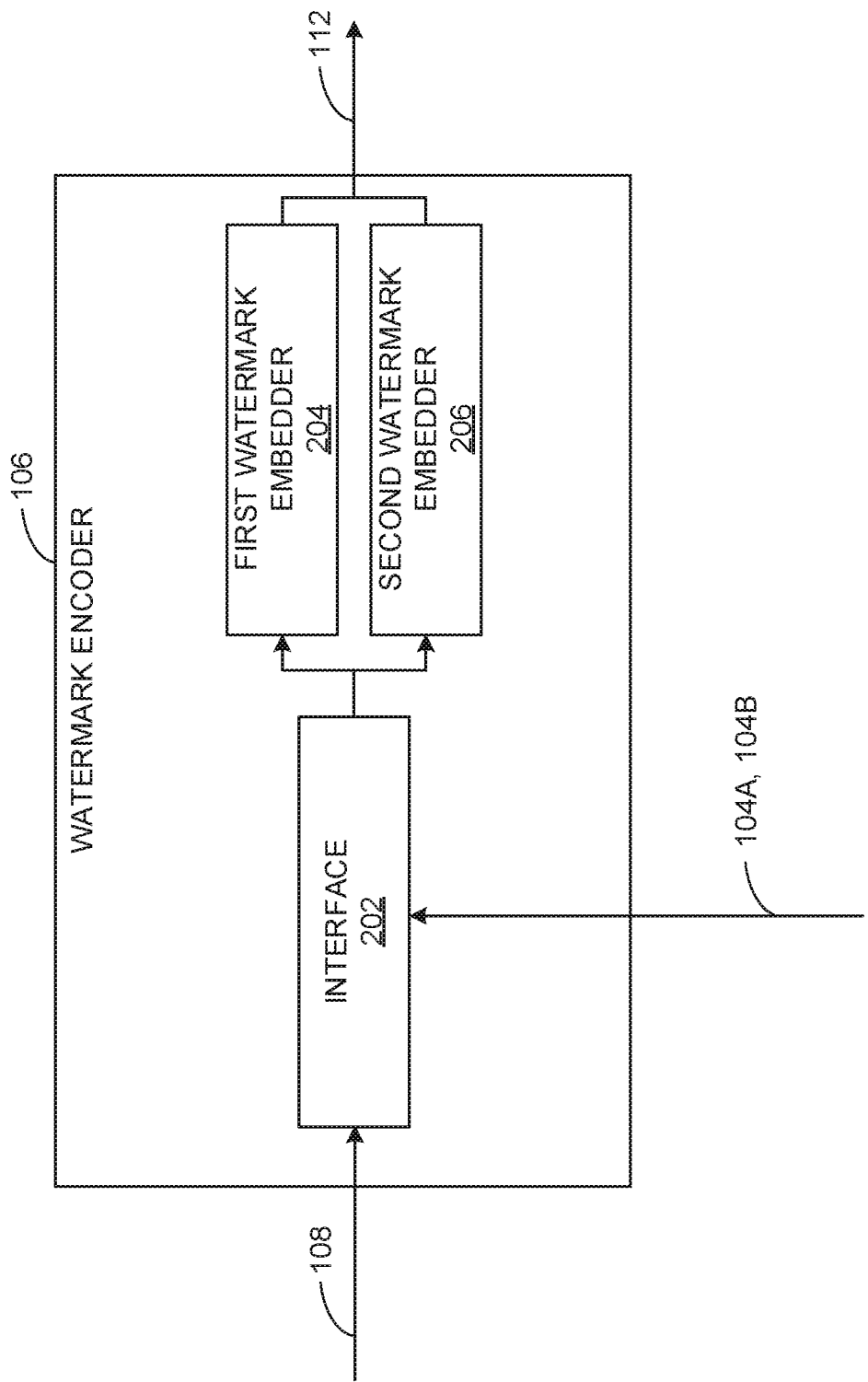
FIG. 2 is a block diagram of an example implementation of the watermark encoder of FIG. 1.

FIG. 2 is a block diagram of an example implementation of the watermark encoder 106 of FIG. 1. In the illustrated example of FIG. 2, the example watermark encoder 106 include an example interface 202, an example first watermark embedder 204, and an example second watermark embedder 206. In some examples, the watermark encoder 106 can be implemented by a single encoding device, system, or a combination of devices located at a media provider and/or the audience measurement entity 102.

The example interface 202 is a network or other communication interface that allows the example watermark encoder 106 to receive the media stream 108 (e.g., from a media provider, etc.) and the watermarks 104A, 104B from the audience measurement entity 102 (e.g., via a network). In some examples, the example interface 202 can convert the watermarks 104A, 104B and/or media stream 108 into a form usable by the first watermark embedder 204 and/or second watermark embedder 206. In some examples, the interface 202 can be in continuous communication with the audience measurement entity 102. In other examples, the interface 202 can be in periodic communication or as-needed with the audience measurement entity 102.

The example first watermark embedder 204 embeds the first watermark 104A into the media stream 108. For example, the first watermark embedder 204 can encode the first watermark 104A in accordance with a first watermark technology with a first encoding schema. For example, the first watermark embedder 204 can encode the first watermark 104A in a first frequency band or bands of the media stream 108 at a first encoding rate and/or with a first payload size. In some examples, the first watermark embedder 204 can set one or more indicator bit(s) (e.g., bit(s) of the payload) to indicate if the first watermark 104A (or groups of successive first watermarks 104A) is(are) to be combined with the second watermark 104B (or groups of successive second watermarks 104B), bolstered by the second watermark 104B (or groups of successive second watermarks 104B) or treated independently. In some examples, the first watermark embedder 204 can detect an indicator bit (e.g., set by the audience measurement entity 102) and encode the indicator bit into the payload of the first watermark 104A to be embedded into the media stream 108.

The example second watermark embedder 206 embeds the second watermark 104B into the media stream 108. For example, the first watermark embedder 204 can encode the second watermark 104B in accordance with a second watermark technology with a second encoding schema. For example, the second watermark embedder 206 can encode the second watermark 104B in a second frequency band or bands of the media stream 108 at a second encoding rate and/or with a second payload size. The second frequency band(s), the second encoding rate and/or the second payload size may be different from the respective first frequency band(s), first encoding rate and/or first payload size. In some examples, the second watermark embedder 206 can set one or more encoder bit(s) (e.g., bit(s) of the payload) to indicate if the second watermark 104B (or groups of successive second watermarks 104B) is(are) to be combined with the first watermark 104A (or groups of successive first watermarks 104A), used to bolster the first watermark 104A (or groups of successive first watermarks 104A) or treated independently. In some examples, the second watermark embedder 206 can embed the second watermark 104B such that it is aligned with the first watermark 104A. In some examples, the first watermark embedder 204 can communicate with the second watermark embedder 206. Once the first watermark embedder 204 and the second watermark embedder 206 have embedded the first watermark 104A (or groups of successive first watermarks 104A) and the second watermark 104B (or groups of successive second watermarks 104B) into the media stream 108, respectively, the watermark encoder 106 outputs the example encoded media stream 110.

While an example manner of implementing the watermark encoder 106 of FIG. 1 is illustrated in FIG. 2, one or more of the elements, processes and/or devices illustrated in FIG. 2 may be combined, divided, re-arranged, omitted, eliminated and/or implemented in any other way. Further, the example interface 202, the example first watermark embedder 204, the example second watermark embedder 206, and/or, more generally, the example watermark encoder 106 of FIG. 2 may be implemented by hardware, software, firmware and/or any combination of hardware, software and/or firmware. Thus, for example, any of the example interface 202, the example first watermark embedder 204, the example second watermark embedder 206 and/or, more generally, the example watermark encoder 106 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 202, the example first watermark embedder 204, the example second watermark embedder 206 is/are hereby expressly defined to include a non-transitory computer readable storage device or storage disk such as a memory, a digital versatile disk (DVD), a compact disk (CD), a Blu-ray disk, etc. including the software and/or firmware. Further still, the example watermark encoder 106 of FIG. 1 may include one or more elements, processes and/or devices in addition to, or instead of, those illustrated in FIG. 2 and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
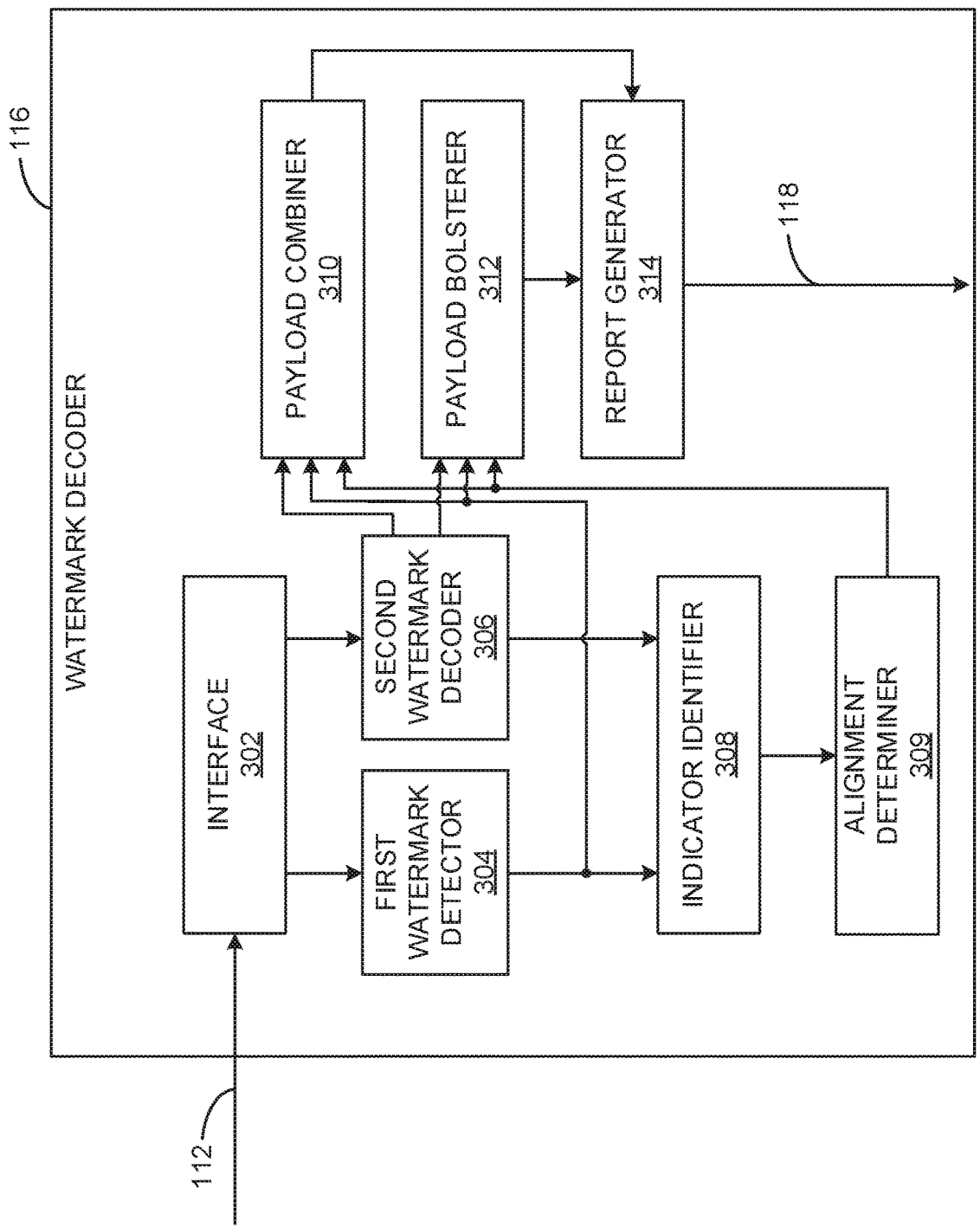
FIG. 3 is a block diagram of an example implementation of the watermark decoder of FIG. 1.

FIG. 3 is a block diagram of an example implementation of the watermark decoder 116 of FIG. 1. The example watermark decoder 116 includes an example interface 302, an example first watermark detector 304, an example watermark detector 306, an example indicator identifier 308, an example alignment determiner 309, an example payload combiner 310, an example payload bolsterer 312, and an example report generator 314.

The example interface 302 monitors the media device 112 to monitor the encoded media stream 110 presented at the media device 112. For example, the interface 302 can be an audio sensor that detects audio emitted by the media device. In some examples, the interface 302 can be a direct communication (e.g., a wired connection) with the media device 112.

The example first watermark detector 304 detects the first watermark 104A embedded in the encoded media stream 110. In the illustrated example, the first watermark detector 304 can detect watermarks encoded with the first watermark technology and according to the first encoding schema. For example, the first watermark detector 304 can detect watermarks encoded with the first watermark technology according to a first encoding schema, such as the watermark 104A, embedded in a first frequency band or bands of the encoded media stream 110 and with a first encoding rate and/or payload size. Similarly, the example second watermark detector 306 detects the second watermark 104B embedded in the encoded media stream 110. For example, the second watermark detector 306 can detect watermarks encoded with the second watermark technology according to a second encoding schema, such as the watermark 104B, embedded in a second frequency band or bands of the encoded media stream 110, different than the first frequency band(s) and with a second encoding rate and/or second payload size, different from the first encoding rate and first payload size. In some examples, the first watermark detector 304 and second watermark detector 306 may be implemented as a single watermark detector. In such examples, the combined watermark detector detects all watermarks embedded in the encoded media stream 110.

The example indicator identifier 308 determines the value of indicator bit(s) included in the first watermark 104A and second watermark 104B. For example, the watermarks 104A, 104B can included bits that indicate whether the watermarks are to be combined, bolstered or treated independently. For example, if the first watermark 104A and the second watermark 104B both include an indicator bit set to "1" (or another specific value), the indicator identifier 308 can determine that the watermarks 104A, 104B are to be combined. For example, if the watermarks 104A, 104B both include an indicator bit set to "0" (or another specific value), the indicator identifier 308 can determine the second watermark 104B is to be used to bolster the first watermark 104A. In some examples, if the watermarks 104A, 104B have respective indicator bits with different values (e.g., the indicator bit of the first watermark 104A is "1" and the indicator bit of the second watermark 104B is "0," etc.), the indicator identifier 308 can determine the watermarks 104A, 104B are to be treated independently. In some examples, any other values or combination of values may be used in the indicator bits to identify how the watermarks 104A, 104B are to be treated by the watermark decoder 116. In some examples, the indicator bits may be first bits of the respective watermarks 104A, 104B and/or bits at other locations in the respective watermarks 104A, 104B.

The example alignment determiner 309 determines the alignment of the watermarks 104A, 104B. For example, the alignment determiner 309 determines if the watermarks 104A, 104B are in phase (e.g., recur over the same time period with similar related offsets to each other). In some examples, if the watermarks 104A, 104B are not aligned, they are treated separately regardless of the values of the indicator bits determined by the indicator identifier 308. Example alignments of the watermarks 104A, 104B are described below in conjunction with FIGS. 5A and 5B.

The example payload combiner 310 combines the payloads of the watermarks 104A, 104B. For example, the payload combiner 310 can extract the payloads from the watermarks 104A, 104B and concatenate the extracted payloads to create a combined payload. In other examples, the payload combiner 310 can combine the payloads of the watermarks 104A, 104B by any other suitable means (randomly, alternating bits, etc.). In some examples, the combined payload can be processed as a single data structure. In some examples, the payload combiner 310 can operate if the alignment determiner 309 determines the watermarks 104A, 104B are aligned and the indicator identifier 308 determines the indicator bits of the respective watermarks 104A, 104B indicate the watermarks 104A, 104B are to be combined. In some examples, the payload combiner 310 can operate under any other suitable conditions.

The example payload bolsterer 312 bolsters the first watermark 104A using the second watermark 104B. For example, the payload bolster 312 can extract the payloads from the watermarks 104A, 104B. In such examples, the payloads of the watermarks 104A, 104B contain the similar information (e.g., include bits or subset of bits of the same values, etc.) and can be used to verify the integrity of each payload of relative to the other. In some examples, the payload combiner 310 can operate if the alignment determiner 309 determines the watermarks 104A, 104B are aligned and the indicator identifier 308 determines the respective indicator bits of the watermarks 104A, 104B indicate the watermarks 104A, 104B are to be used for bolstering. In other examples, the payload combiner 310 can operate under any other suitable conditions.

The example report generator 314 uses the payload output by the payload combiner 310 or payload bolsterer 312 to generate the example media identifier 118. In some examples, the report generator 314 can identify the media associated with the encoded media stream 110. In some examples, the report generator 314 can further include the demographic information associated with a user of the media device 112. In some examples, the report generator 314 can generate an error message. For example, the report generator 314 can generate an error message if the alignment determiner 309 determines the watermarks 104A, 104B are not properly aligned and/or if the indicator identifier 308 determines the indicator bits of the watermarks 104A, 104B have different values.

While an example manner of implementing the watermark decoder 116 of FIG. 1 is illustrated in FIG. 3, one or more of the elements, processes and/or devices illustrated in FIG. 3 may be combined, divided, re-arranged, omitted, eliminated and/or implemented in any other way. Further, the example interface 302, the example first watermark detector 304, the example watermark detector 306, the example indicator identifier 308, the example alignment determiner 309, the example payload combiner 310, the example payload bolsterer 312, the example report generator 316, and/or, more generally, the example watermark decoder 116 of FIG. 3 may be implemented by hardware, software, firmware and/or any combination of hardware, software and/or firmware. Thus, for example, any of the example interface 302, the example first watermark detector 304, the example watermark detector 306, the example indicator identifier 308, the example alignment determiner 309, an example payload combiner 310, the example payload bolsterer 312, the example report generator 316 and/or, more generally, the example watermark decoder 116 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 302, the example first watermark detector 304, the example watermark detector 306, the example indicator identifier 308, the example alignment determiner 309, an example payload combiner 310, the example payload bolsterer 312, the example report generator 316, and/or, more generally, the example watermark decoder 116 of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example watermark decoder 116 of FIG. 1 may include one or more elements, processes and/or devices in addition to, or instead of, those illustrated in FIG. 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4A:
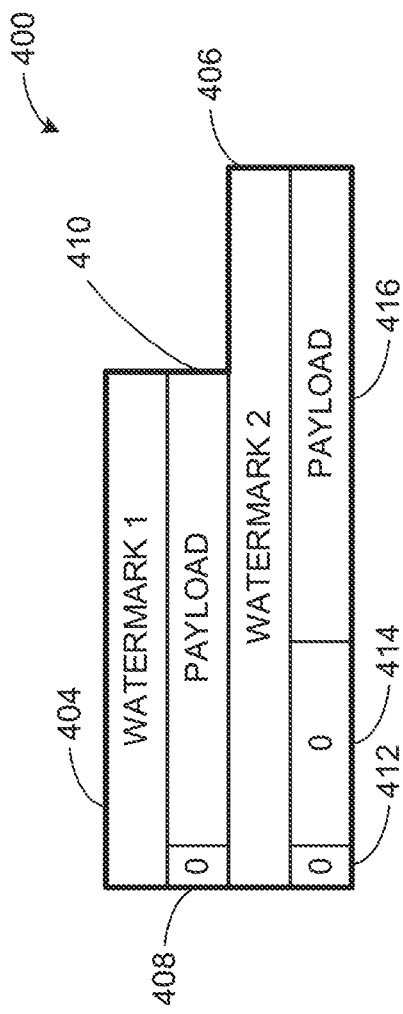
FIGS. 4A and 4B are block diagrams of payload configurations of example outputs of the watermark encoder of FIG. 2.

FIG. 4A is a block diagram of first example payload configuration of an example output 400 of the watermark encoder of FIG. 2. The example output 400 includes an example first watermark 404 and an example second watermark 406. The example first watermark 404 includes an example first indicator bit 408 and an example first payload 410. The example second watermark 406 includes an example second indicator bit 412, an example filler data field 414 and an example second payload 416. In the illustrated example of FIG. 4A, the indicator bits 408, 412 indicate the second watermark 406 is to be used to bolster the first watermark 404.

In the illustrated example of FIG. 4A, the watermarks 404, 406 are data structures that includes a plurality of bits. For example, the watermarks 404, 406 are embedded in a media stream (e.g., the example media stream 108) such that when they are decoded (e.g., by the watermark decoder 116, etc.) the data can be reproduced (e.g., by the media meter 114, etc.). In some examples, the watermarks 404, 406 can correspond to the watermarks 104A, 104B of FIG. 1, respectively.

In the illustrated example, the values of the indicator bits 408, 412 indicate to a watermark decoder (e.g., the watermark decoder 116 of FIG. 1) that the first payload 410 is to be bolstered with the second payload 416. Additionally or alternatively, the second payload 416 can be bolstered with the first payload 410. In the illustrated example, the first indicator bit 408 and the second indicator bit 412 each have the value of "0" to indicate that the respective watermark payloads 410 and 416 are to be used for bolstering each other. In the illustrated example, the first indicator bit 408 and the second indicator bit 412 are a single bit in size. In other examples, one or both of the indicator bits 408, 412 can have sizes larger than a single bit (e.g., 2 bits, a byte, etc.). In such examples, the values of the indicator bits 408, 412 can be used to indicate other properties of the first watermark 404 and/or second watermark 406 (e.g., the relative position(s) of the second payload 416 and the filler data field 414, etc.). In the illustrated example, the first indicator bit 408 is the first bit of the first watermark 404 and the second indicator bit 412 is the first bits of the second watermark 406. In other examples, the indicator bits 408, 412 can have any other suitable position(s) in the watermarks 404, 406.

In the illustrated example of FIG. 4A, the second watermark 406 is larger (e.g., contains more bits of data, etc.) than the first watermark 406. In some examples, because the second payload 416 is being used to bolster the first payload 410, the extra data of the second payload 416 is not used in the second watermark 406. In such examples, the extra data of the second watermark 406 is included in the example filler data field 414. In some examples, the filler data field 414 contains extraneous data that is not used to bolster the first payload 410. In other examples, the filler data field 414 can contain any other suitable information. In some examples, the filler data field 414 can be absent (e.g., be incorporated into the indicator bit 412, etc.).

Figure 4B:
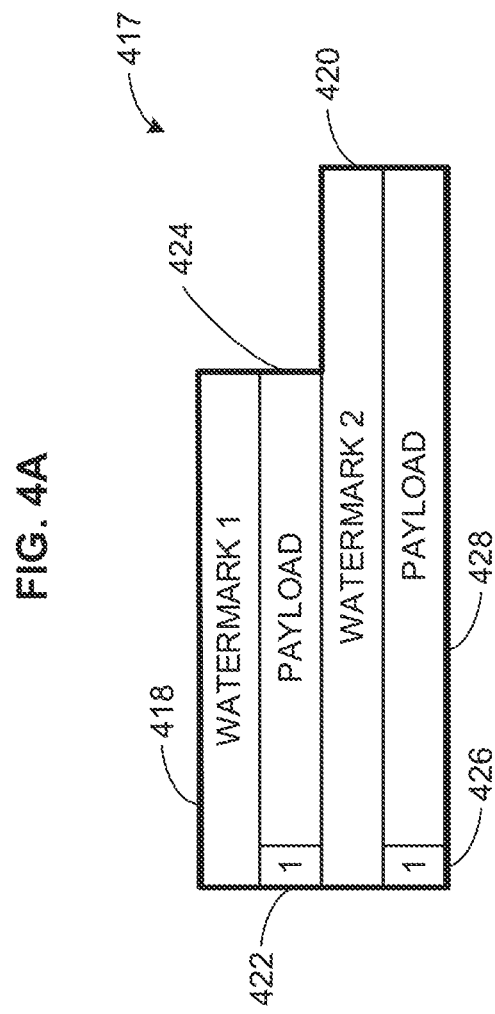

FIG. 4B is a block diagram of a second example payload configuration of an example output 417 of the watermark encoder of FIG. 2. The example output 417 includes an example first watermark 418 and an examples second watermark 420. The example first watermark 418 includes an example first indicator bit 422 and an example payload 410. The example second watermark 406 includes an example second indicator bit 426, and an example second payload 428. In the illustrated example of FIG. 4A, the indicator bits 422, 426 indicate the first payload 424 and the second payload 428 are to be combined.

In the illustrated example of FIG. 4B, the watermarks 418, 420 are data structures that include a plurality of bits. For example, the watermarks 418, 420 are embedded in a media stream (e.g., the example media stream 108) such that when they are decoded (e.g., by the watermark decoder 116, etc.) the data of the watermarks 418, 420 can be reproduced (e.g., by the media meter 114, etc.). In some examples, the watermarks 418, 420 can correspond to the watermarks 104A, 104B of FIG. 1, respectively.

In the illustrated example, the values of the indicator bits 422, 426 indicate to a watermark decoder (e.g., the watermark decoder 116 of FIG. 1) that the first payload 424 is to be combined with the second payload 428. In the illustrated example of FIG. 4A, the first indicator bit 422 and the second indicator bit 426 each have the value of "1" is included in respective payloads 424 and 428 are to be combined. In some examples, the indicator bits 422, 426 can have any other suitable values. In the illustrated example, the first indicator bit 422 and the second indicator bit 426 are a single bit in size. In other examples, one or both of the indicator bits 422, 426 can have sizes larger than a single bit (e.g., 2 bits, a byte, etc.). In such examples, the values of the indicator bits 422, 426 can be used to indicate other properties of the first watermark 418 and/or second watermark 420. In the illustrated example, the first indicator bit 422 is the first bit of the first watermark 418 and the second indicator bit 426 is the first bit of the second watermark 420. In other examples, the first and second indicator bits 422, 426 can have any other suitable position(s) in the watermarks 418, 420.

When decoded by a watermark decoder (e.g., the watermark decoder 116 of FIG. 1, etc.), the first payload 424 and the second payload 428 are combined. For example, the payloads 424, 428 can be concatenated. In other examples, the payloads 424, 428 can be combined in any other suitable manner (e.g., randomly, alternating bits, etc.). In some examples, the combined payload is equal in size to the sum of the first payload 424 and the second payload 428. In other examples, one or more of the bits of the first payload 424 and/or the second payload 428 can be discarded from the combined payload.

FIG. 5A is a block diagram of an alignment 500 of an example output of the watermark encoder of FIG. 2. The example alignment 500 includes an example sequence of first watermarks 501 which include an example first instance 502A, an example second instance 502B, and an example third instance 502C. The example alignment 500 further includes an example an example sequence of second watermarks 503 which include an example first instance 504A, and an example second instance 504B. In the illustrated example of FIG. 5A, the alignment 500 occurs in an example time window 506. In the illustrated example of FIG. 5A, the example first watermarks 501 are in the same phase (e.g., in-phase, etc.) as the example second watermarks 503 such that the first instance 502A of the first watermarks 501 and the first instance 504A of the second watermarks 503 begin at the beginning of the time window 506 and the third instance 502C of the first watermarks 501 and the second instance 504B of the second watermarks 503 (e.g., the last instances) end at the end of the time window 506. The example first watermarks 501 occur three times within the time window 506. The example second watermarks 503 occur two times within the time window 506. In other examples, the watermarks 501, 503 can occur any suitable number of times over the time window 506. In some examples, the alignment 500 (e.g., three instances of the first watermark 501 and two instances of the second watermark 503, etc.) occurs at every duration of the time window 506 in the media stream.

FIG. 5B is a block diagram of an alignment 508 of an example output of the watermark encoder of FIG. 2. The example alignment 510 includes an example sequence of first watermarks 509 which include an example first instance 510A, an example second instance 510B, and an example third instance 510C. The example alignment 508 further includes an example sequence of second watermarks 511 which include an example first instance 512A, and an example second instance 512B. In the illustrated example of FIG. 5B, the example first watermarks 509 are not in alignment (e.g., not in-phase, etc.) with the example second watermarks 511 because the first instance 510A of the first watermarks 509 and the first instance 512A of the second watermarks 511 do not begin at the beginning of the time window 506 and the third instance 510C of the first watermarks 509 and the second instance 512B of the second watermarks 511 (e.g., the last instances) do not end at the end of the time window 506. In this example, a watermark decoder (e.g., the watermark decoder 116) would treat the watermarks 509, 511 independently regardless of the indicator bits associated with the first watermark 509 and/or the second watermark 511.

Figure 6:
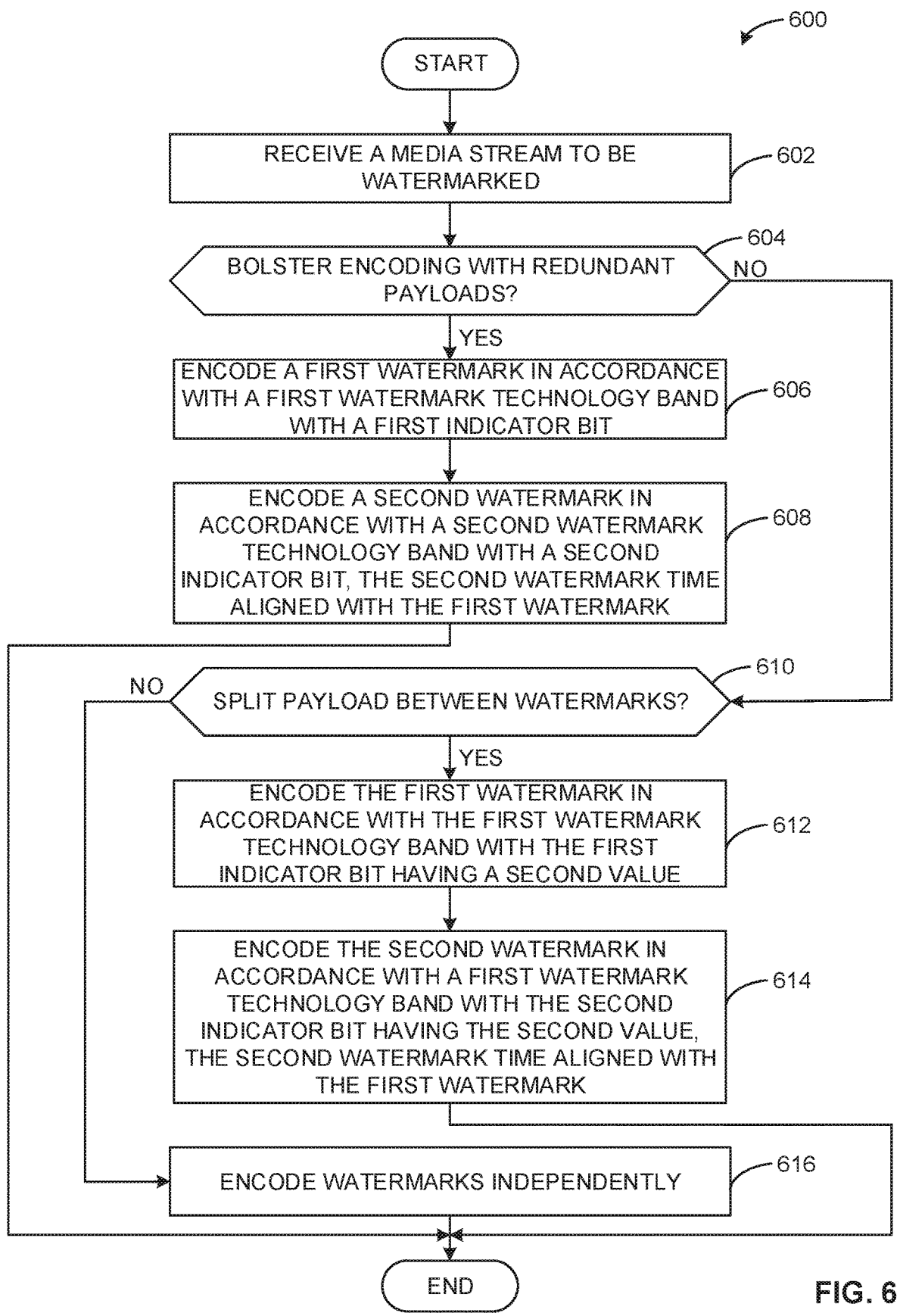
FIG. 6 is a flowchart representative of machine readable instructions which may be executed to implement the watermark encoder of FIGS. 1 and/or 2.

A flowchart representative of example hardware logic, machine readable instructions, hardware implemented state machines, and/or any combination thereof for implementing the watermark encoder 106 of FIG. 2 is shown in FIG. 6. The machine readable instructions may be one or more executable programs or portion(s) of an executable program for execution by a computer processor such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowchart illustrated in FIG. 6, many other methods of implementing the example watermark encoder 106 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 7:
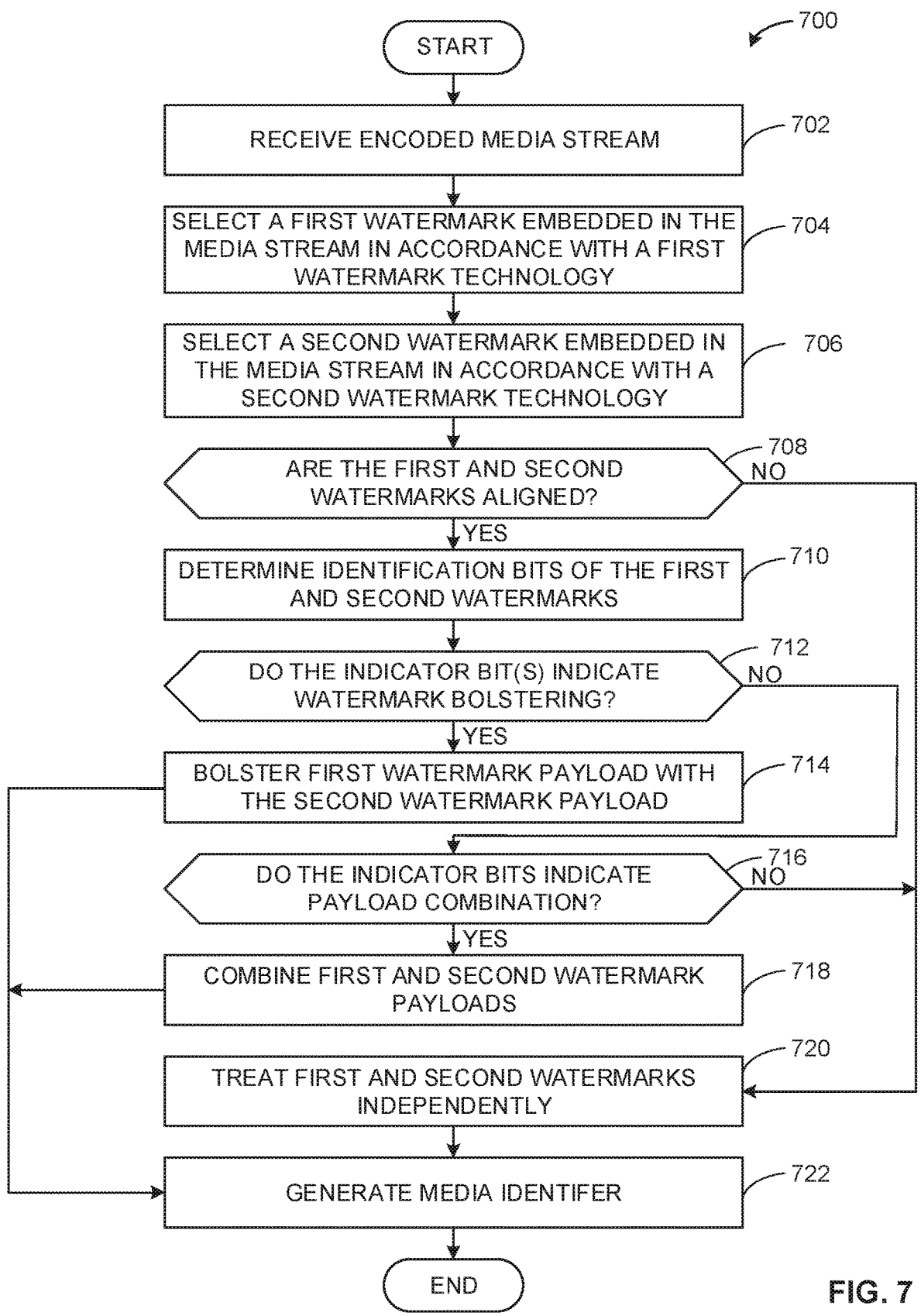
FIG. 7 is a flowchart representative of machine readable instructions which may be executed to implement the watermark decoder of FIGS. 1 and/or 3.

A flowchart representative of example hardware logic, machine readable instructions, hardware implemented state machines, and/or any combination thereof for implementing the watermark decoder 116 of FIG. 3 is shown in FIG. 7. The machine readable instructions may be one or more executable programs or portion(s) of an executable program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 7, many other methods of implementing the example watermark decoder 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 6-7 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

The program 600 of FIG. 6 includes block 602. At block 602, the example interface 202 of the watermark encoder 106 receives a media stream 108 to be watermarked. For example, the example interface 202 can receive a media stream 108 from a media provider and/or a media broadcaster. In some examples, the media stream can be a live stream (e.g., a sports broadcast, etc.). In some examples, the media stream 108 can be a pre-recorded media stream (e.g., a movie, a syndicated program, etc.). In such examples, the interface 202 can receive the media stream 108 from a memory associated with the watermark encoder 106 (e.g., the local memory 813 of FIG. 8, the non-volatile memory 816 of FIG. 8, the mass storage of FIG. 8, etc.).

At block 604, the interface 202 determines if the encoding will be bolstered with redundant payloads. For example, the interface 202 can determine if the encoding will be bolstered with redundant payloads by considering an instruction received with the media stream 108, an instruction received with the watermark 104A, and/or an instruction received with the watermark 104B. Additionally or alternatively, the interface 202 can determine if the encoding will be bolstered with redundant payloads based on a property of the media stream 108. If the encoding is to be bolstered with redundant payloads, the process 600 advances to block 606. If the encoding is to be bolstering with redundant payloads, the process 600 advances at block 610.

At block 606, the example first watermark embedder 204 encodes a first watermark in accordance with a first watermark technology band with a first indicator bit. For example, the first watermark embedder 204 can encode the media stream 108 with the example first watermark 104A in accordance with a first watermark technology (e.g., NWCC, etc.) and an associated encoding schema. In such examples, the first watermark embedder 204 can embed the first watermark 104A in a frequency or frequencies of the media stream 108 and/or at an encoding rate in accordance with the first encoding schema. In some examples, the first watermark embedder 204 can set an indicator bit of the first watermark 104A (e.g., the indicator bit 408 of FIG. 4) to a value indicative of watermark bolstering. In other examples, the indicator bit 408

At block 608, the example second watermark embedder 206 encodes a second watermark in accordance with a second watermark technology with a second indicator bit, the second watermark time aligned with the first watermark. For example, the second watermark embedder 206 can encode the media stream 108 with the example second watermark 104B in accordance with a second watermark technology (e.g., CBET watermark, etc.) and an associated encoding schema. In such examples, the second watermark embedder 206 can embed the second watermark 104B in a frequency or frequencies of the media stream 108 and/or at an encoding rate in accordance with the first encoding schema. In some examples, the second watermark embedder 206 can set an indicator bit of the second watermark 104B (e.g., the indicator bit 412 of FIG. 4A) to a value indicative of watermark bolstering. In some examples, the second watermark embedder 206 can embed the watermark 104B with the same payload as the first watermark 104A. In some examples, the second watermark embedder 206 can align the second watermark 104B with the first watermarks 104A such that the watermarks 104A, 104B are in phase. The process 600 then ends.

At block 610, the interface 202 determines if the payload is to be split between watermarks and thus, the watermarks are to be combined by the watermark decoder 116. For example, the interface 202 can determine if the watermark payloads will be combined by considering an instruction received with the media stream 108, an instruction received with the watermark 104A, and/or an instruction received with the watermark 104B. Additionally or alternatively, the interface 202 can determine if the will be combined based on a property of the media stream 108. If the payload is to be split between watermarks such that the payloads are to be combined at the watermark decoder 116, the process 600 advances to block 612. If watermark encoding is not to be split between watermarks, the process 600 advances at block 616.

At block 612, the example first watermark embedder 204 encodes the first watermark in accordance with the first watermark technology with the first indicator bit having a second value. For example, the first watermark embedder 204 can encode the media stream 108 with the example first watermark 104A in accordance with a first watermark technology (e.g., NWCC, etc.) and an associated encoding schema. In such examples, the first watermark embedder 204 can embed the first watermark 104A in a frequency or frequencies of the media stream 108 and/or at an encoding rate in accordance with the first encoding schema. In some examples, the first watermark embedder 204 can set an indicator bit of the first watermark 104A (e.g., the indicator bit 408 of FIG. 4) to a value indicative of payload combining.

At block 614, the example second watermark embedder 206 encodes the second watermark in accordance with the second watermark technology with the second indicator bit having the second value, the second watermark time aligned with the first watermark. For example, the second watermark embedder 206 can encode the media stream 108 with the example second watermark 104B in accordance with a second watermark technology (e.g., CBET CC, etc.) and an associated encoding schema. In such examples, the second watermark embedder 206 can embed the second watermark 104B in a frequency or frequencies of the media stream 108 and/or at an encoding rate in accordance with the second encoding schema. In some examples, the second watermark embedder 206 can set an indicator bit of the second watermark 104B (e.g., the indicator bit 412 of FIG. 4A) to a value indicative of payload combiner. In some examples, the second watermark embedder 206 can align the second watermark 104B with the first watermarks 104A such that the watermarks 104A, 104B are in phase. The process 600 then ends.

At block 616, the first watermark embedder 204 and/or the second watermark embedder 206 embed the first watermark 104A and the second watermark 104B independently. In other examples, the interface 202 can transmit an error message indicating that watermarks 104A, 104B are improperly encoded. The process 600 then ends.

The program 700 of FIG. 7 includes block 702. At block 702, the interface 302 of the watermark decoder 116 receives the encoded media stream 110. For example, the interface 302 can communicate with and/or monitor the media device 112 to receive the encoded media stream 110. In some examples, the interface 302 can retrieve the encoded media stream 110 from a memory associated with the media device 112 and/or media meter 114. In some examples, the interface 302 can receive only the audio associated with the encoded media stream 110. In some examples, the interface 302 can receive both the audio and video associated with the encoded media stream 110.

At block 704, the first watermark detector 304 selects a first watermark 104A embedded in the encoded media stream 110 in accordance with a first watermark technology. For example, the first watermark detector 304 can be configured to detect watermarks embedded with a first encoding schema (e.g., in a first frequency band or bands of media stream, at a first encoding rate, at first payload size, etc.) associated with the first watermark technology. In some examples, the first watermark detector 304 can extract the information from the watermark 104A (e.g., a payload, an indicator bit, etc.). In some examples, the first watermark detector 304 can further determine timestamps associated with the first watermark 104A. In such examples, the determined timestamps can be used to determine the alignment of the first watermark 104A relative to other watermarks embedded in the encoded media stream 110.

At block 706, the second watermark detector 306 selects a second watermark 104B embedded in the encoded media stream 110 in accordance with a second watermark technology. For example, the first watermark detector 304 can be configured to detect watermarks embedded with a second encoding schema (e.g., in a second frequency band of media stream, at a second encoding rate, a second payload size, etc.) associated with the second watermark technology. In some examples, the second watermark detector 306 can select a watermark 104B from a different frequency band or bands than the first watermark detector 304. In some examples, the first watermark detector 304 can extract the information from the watermark 104B (e.g., a payload, an indicator bit, filler data structures, etc.). In some examples, the second watermark detector 306 can further determine timestamps associated with the second watermark 104B. In such examples, the determined timestamps can be used to determine the alignment of the second watermark 104B relative to other watermarks embedded in the encoded media stream 110.

At block 708, the alignment determiner 309 determines if the watermarks 104A, 104B are aligned (e.g., in phase, etc.). For example, the alignment determiner can compare timestamps associated with the watermarks 104A, 104B to determine if the watermarks are aligned by determining whether a group of one or more watermarks 104A and a group of one or more watermarks 104B start and end at the same times (or substantially the same times within an error tolerance) over a time period of the media. In other examples, the alignment determiner 309 can determine if the watermarks 104A, 104B are aligned by any other suitable method. If the alignment determiner determines the watermarks are aligned (e.g., the watermarks 104A, 104B have an alignment 500 of FIG. 5, etc.), the process 700 advances block 710. If the alignment determiner 309 determines are not aligned (e.g., the watermarks 104A, 104B have an alignment 508 of FIG. 5, etc.), the process 700 advances to block 720.

At block 710, the indicator identifier 308 determines the values of the indicator bits of the first watermarks 104A and the second watermark 104B. For example, the indicator identifier 308 can receive the indicator bit(s) of the first watermark 104A from the first watermark detector 304 and the indicator bit(s) of the second watermark 104B from the second watermark detector 306. In some examples, the indicator identifier 308 can determine the values of the indicator bits of the watermarks 104A, 104B by any other suitable means. In some examples, the indicator identifier 308 can identify the binary value of the indicator bits (e.g., the indicator bits 408, 412, 422, 426, etc.).

At block 712, the indicator identifier 308 determines if the indicator bit(s) of the watermarks 104A, 104B indicate bolstering. For example, the indicator identifier 308 if the indicator bit(s) of the watermarks 104A, 104B have the same value (e.g., "0") which indicate that the payloads of the watermarks 104A, 104B should be used to bolster each other (e.g., see the output 400 of FIG. 4A). If the indicator identifier 308 determines the indicator bit(s) do indicate the watermarks 104A, 104B are to be used to bolster one another, the process 700 advances to block 714. If the indicator identifier 308 determines the indicator bit(s) do not indicate the watermarks 104A, 104B are to be used to bolster one another, the process 700 advances to block 716.

At block 714, the payload bolsterer 312 bolsters the first watermark payload (e.g., the payload 410 of FIG. 4A) with the second watermark payload (e.g., the payload 416 of FIG. 4A). For example, the payload bolsterer 312 can verify the integrity of the first payload 410 with the second payload 416. In some examples, the payload bolsterer 312 can identify any portions of the first payload that were difficult to decipher due to properties of the encoded media stream 110. In such examples, the payload bolsterer 312 can complete the first payload using redundant portions of the second payload 416. The process then advances to block 722.

At block 716, the indicator identifier 308 determines if the indicator bit(s) of the watermarks 104A, 104B indicate payload combination. For example, the indicator identifier 308 if the indicator bit(s) of the watermarks 104A, 104B have the same value (e.g., "1") which indicate that the payloads of the watermarks 104A, 104B should be combined (e.g., see the output 417 of FIG. 4A). If the indicator identifier 308 determines the indicator bit(s) do indicate the watermarks 104A, 104B are to be to combine, the process 700 advances to block 718. If the indicator identifier 308 determines the indicator bit(s) do not indicate the watermarks 104A, 104B are to be combined, the process 700 advances to block 720.

At block 718, the payload combiner 310 combines the first watermark payload (e.g., the first payload 424 of FIG. 4B) with the second watermark payload (e.g., the second payload 428 of FIG. 4B). For example, the payload combiner 310 can concatenate the individual payloads 424, 428 into a combined payload. In some examples, the payload combiner 310 can use any other suitable method to combine the payloads of the first watermark 104A and the second watermark 104B. In such examples, the combined payload is equal in size to the sum of the first payload 424 and the second payload 428. In other examples, the combined payload can be any other suitable size (e.g., one or more bits contained in the first payload 424 and/or second payload 428 can be discarded, etc.)

At block 720, the watermark decoder 116 treats the first watermark 104A and the second watermark 104B independently. For example, the watermark decoder 116 can retrieve the information encoded in the first watermark 104A and the second watermark 104B independently. In such examples, the watermarks 104A, 104B could have encoded by entities not working in tandem. In other examples, the first watermarks 104A and/or second watermark 104B could have erroneously encoded into the media stream 108. In some examples, the report generator 314 can generate an error message indicating the watermarks 104A, 104B are improperly encoded.

At block 722, the report generator 314 generates the media identifier 118. For example, if the payload bolsterer 312 bolstered the first payload 410 with the second payload 416, the report generator 314 can retrieve information from the bolstered first payload 410 of the first watermark 104A generate the media identifier. For example, if the payload combiner 310 combined the first payload 410 with the second payload 416, the report generator 314 can retrieve information from the combined payload of the first watermark 104A generate the media identifier. In some examples, the media identifier 118 can be used by the audience measurement entity to credit a user associated with the media device 112 with exposure to the media.

Figure 8:
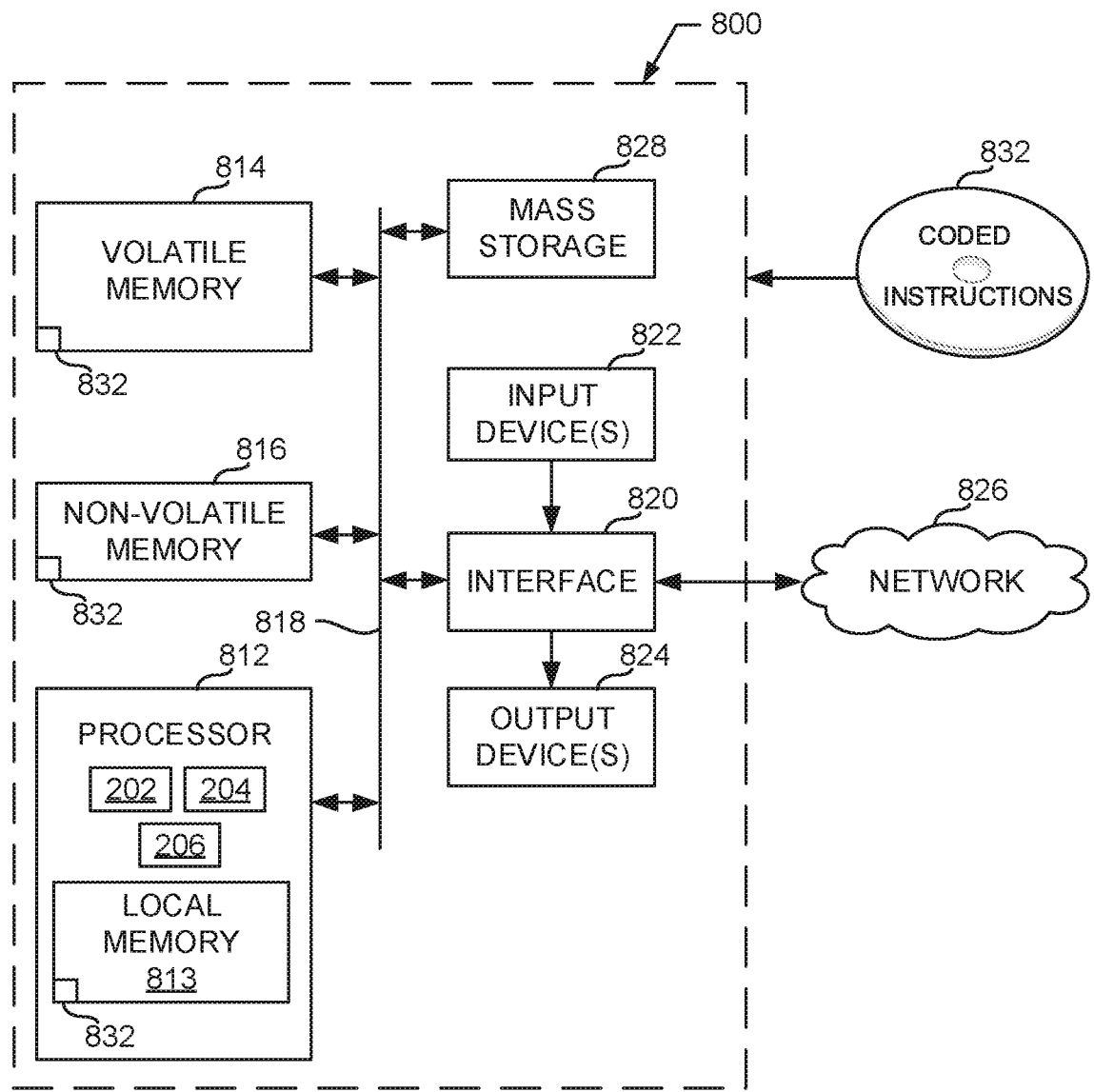
FIG. 8 is a block diagram of an example processing platform structured to execute the instructions of FIG. 6 to implement the watermark encoder of FIGS. 1 and/or 2.

FIG. 8 is a block diagram of an example processor platform 800 structured to execute the instructions of FIG. 6 to implement the watermark encoder 106 of FIGS. 1 and 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example interface 202, the example first watermark embedder 204 and the example second watermark embedder 206.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIG. 6 may be stored in the mass storage device 828, in the volatile memory 814, in the non-volatile memory 816, and/or on a removable non-transitory computer readable storage medium such as a CD or DVD.

Figure 9:
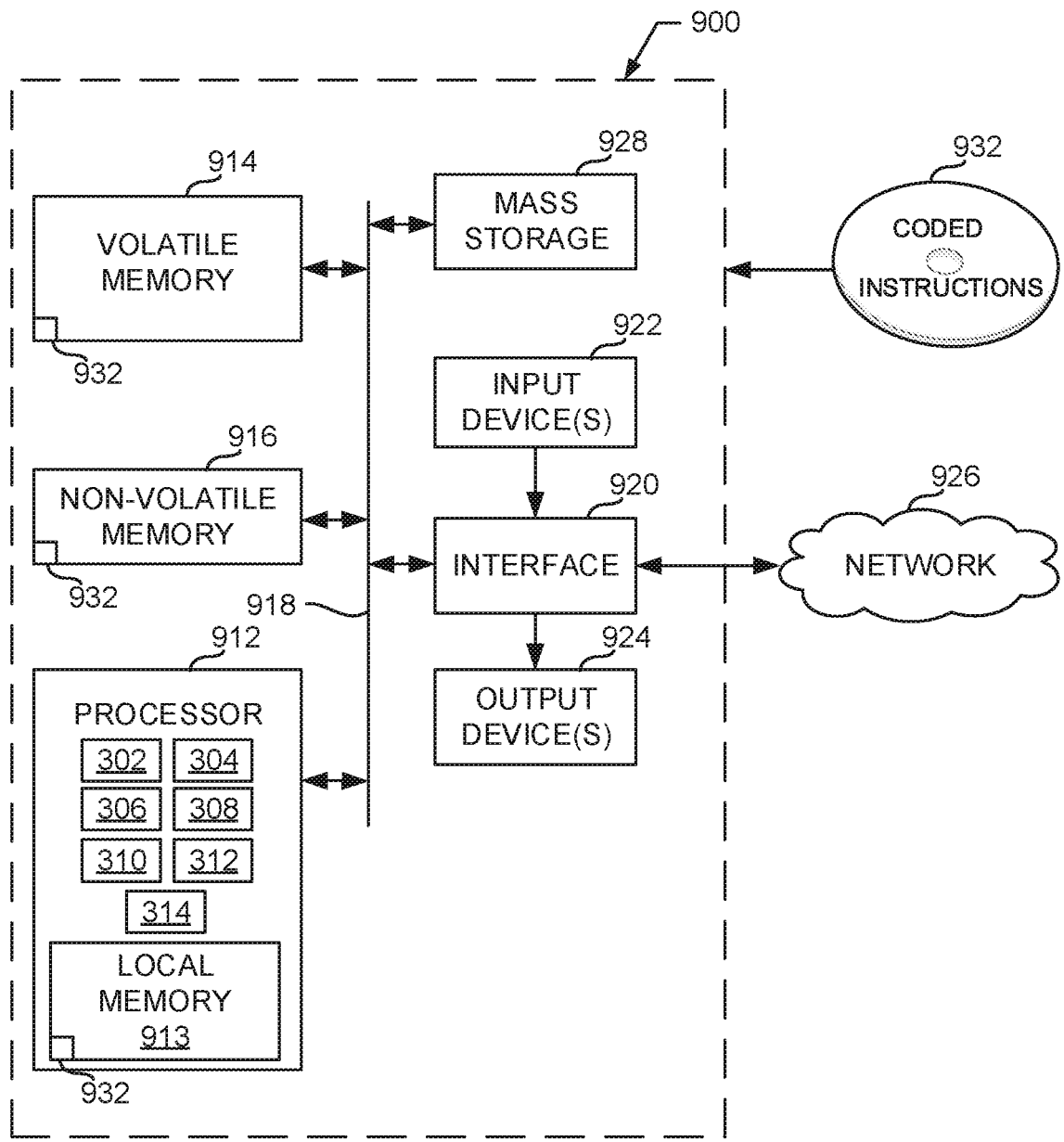
FIG. 9 is a block diagram of an example processing platform structured to execute the instructions of FIG. 7 to implement the watermark decoder of FIGS. 1 and/or 3.

FIG. 9 is a block diagram of an example processor platform 900 structured to execute the instructions of FIG. 7 to implement the watermark decoder 116 of FIGS. 1 and 3. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example interface 302, the example first watermark detector 304, the example watermark detector 306, the example indicator identifier 308, the example payload combiner 310, the example payload bolsterer 312 and the example report generator 314.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 7 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that allow greater amounts of data to be conveyed by watermarks without increasing the size of an individual watermark's payload. For example, larger available payloads increase the number of unique media identifiers that can be conveyed using watermark technology.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A computing system comprising a processor and a memory, the computing system configured to perform a set of acts comprising:
   detecting a first watermark in media content, the first watermark embedded in a time window of the media content in accordance with a first watermark technology;
   detecting a second watermark in the time window of the media content, the second watermark embedded in the time window of the media content in accordance with a second watermark technology;
   determining that the first watermark includes an indicator bit having a first value indicating that a payload of the first watermark is to be combined with a payload of the second watermark and that the second watermark includes an indicator bit having a second value indicating that the payload of the second watermark is to be combined with the payload of the first watermark; and
   based on the determining, combining the payload of the first watermark and the payload of the second watermark, wherein combining the payload of the first watermark and the payload of the second watermark comprises determining an identifier having a size that is larger than a first size supported by the payload of the first watermark and a second size supported by the payload of the second watermark.

2. The computing system of claim 1, wherein the first value and the second value are a same value.

3. The computing system of claim 1, wherein the first watermark and the second watermark are in phase.

4. The computing system of claim 3, wherein:
   the set of acts further comprises determining that the first watermark and the second watermark are in phase, and the combining is based further on the determining that the first watermark and the second watermark are in phase.

5. The computing system of claim 4, wherein:
   the first watermark repeats over the time window,
   a first instance of the first watermark begins at a beginning of the time window, and
   the second watermark begins at the beginning of the time window.

6. The computing system of claim 1, wherein combining the payload of the first watermark and combining the payload of the second watermark comprises concatenating the payload of the first watermark and the payload of the second watermark.

7. A non-transitory computer-readable medium having stored therein instructions that when executed by a computing system cause the computing system to perform a set of acts comprising:
   detecting a first watermark in media content, the first watermark embedded in a time window of the media content in accordance with a first watermark technology;
   detecting a second watermark in the time window of the media content, the second watermark embedded in the time window of the media content in accordance with a second watermark technology;
   determining that the first watermark includes an indicator bit having a first value indicating that a payload of the first watermark is to be combined with a payload of the second watermark and that the second watermark includes an indicator bit having a second value indicating that the payload of the second watermark is to be combined with the payload of the first watermark; and
   based on the determining, combining the payload of the first watermark and the payload of the second watermark, wherein combining the payload of the first watermark and the payload of the second watermark comprises determining an identifier having a size that is larger than a first size supported by the payload of the first watermark and a second size supported by the payload of the second watermark.

8. The non-transitory computer-readable medium of claim 7, wherein the first value and the second value are a same value.

9. The non-transitory computer-readable medium of claim 7, wherein the first watermark and the second watermark are in phase.

10. The non-transitory computer-readable medium of claim 9, wherein:
    the set of acts further comprises determining that the first watermark and the second watermark are in phase, and
    the combining is based further on the determining that the first watermark and the second watermark are in phase.

11. The non-transitory computer-readable medium of claim 10, wherein:
    the first watermark repeats over the time window,
    a first instance of the first watermark begins at a beginning of the time window, and
    the second watermark begins at the beginning of the time window.

12. The non-transitory computer-readable medium of claim 7, wherein combining the payload of the first watermark and combining the payload of the second watermark comprises concatenating the payload of the first watermark and the payload of the second watermark.

13. A method comprising:

detecting, by a computing system, a first watermark in media content, the first watermark embedded in a time window of the media content in accordance with a first watermark technology;

detecting, by the computing system, a second watermark in the time window of the media content, the second watermark embedded in the time window of the media content in accordance with a second watermark technology;

determining, by the computing system, that the first watermark includes an indicator bit having a first value indicating that a payload of the first watermark is to be combined with a payload of the second watermark and that the second watermark includes an indicator bit having a second value indicating that the payload of the second watermark is to be combined with the payload of the first watermark; and based on the determining, combining, by the computing system, the payload of the first watermark and the payload of the second watermark, wherein combining the payload of the first watermark and the payload of the second watermark comprises determining an identifier having a size that is larger than a first size supported by the payload of the first watermark and a second size supported by the payload of the second watermark.

14. The method of claim 13, wherein the first value and the second value are a same value.

15. The method of claim 13, wherein the first watermark and the second watermark are in phase.

16. The method of claim 15, further comprising determining that the first watermark and the second watermark are in phase, wherein the combining is based further on the determining that the first watermark and the second watermark are in phase.

17. The method of claim 16, wherein:

the first watermark repeats over the time window, a first instance of the first watermark begins at a beginning of the time window, and the second watermark begins at the beginning of the time window.

18. The method of claim 13, wherein combining the payload of the first watermark and combining the payload of the second watermark comprises concatenating the payload of the first watermark and the payload of the second watermark.

* * * * *